United States Patent
Lin et al.

(10) Patent No.: US 10,203,777 B2
(45) Date of Patent: Feb. 12, 2019

(54) STYLUS HAVING DETACHABLE FUNCTIONAL PARTS AND OPERATION METHOD THEREOF

(71) Applicant: ASUSTeK COMPUTER INC., Taipei (TW)

(72) Inventors: Hung-Yi Lin, Taipei (TW); Yi-Lun Lai, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 43 days.

(21) Appl. No.: 15/390,730

(22) Filed: Dec. 27, 2016

(65) Prior Publication Data

US 2018/0181218 A1    Jun. 28, 2018

(51) Int. Cl.
G06F 3/0354 (2013.01)
G06F 3/01 (2006.01)

(52) U.S. Cl.
CPC .......... *G06F 3/03545* (2013.01); *G06F 3/016* (2013.01)

(58) Field of Classification Search
CPC .................................................. G06F 3/03545
USPC ....................................................... 345/179
See application file for complete search history.

(56) References Cited

U.S. PATENT DOCUMENTS

| | | | |
|---|---|---|---|
| 8,781,135 B2 | 7/2014 | Lu | |
| 2007/0205996 A1* | 9/2007 | Huang | G06F 3/03545 345/179 |
| 2012/0331546 A1* | 12/2012 | Falkenburg | G06F 3/03545 726/16 |
| 2013/0051576 A1* | 2/2013 | Lu | G06F 3/03545 381/91 |
| 2014/0068113 A1 | 3/2014 | Yang | |
| 2014/0168177 A1* | 6/2014 | Mkrtchyan | G06F 3/03545 345/179 |
| 2015/0029125 A1* | 1/2015 | Grant | G06F 3/0483 345/173 |

FOREIGN PATENT DOCUMENTS

| | | |
|---|---|---|
| CN | 202331377 U | 7/2012 |
| CN | 103593064 U | 2/2014 |
| TW | M431375 U | 6/2012 |
| TW | 201250478 A1 | 12/2012 |

* cited by examiner

*Primary Examiner* — Long D Pham
(74) *Attorney, Agent, or Firm* — CKC & Partners Co., Ltd.

(57) ABSTRACT

A stylus is provided. The stylus comprises a main body and a functional part. The main body includes a first processor, a trigger coupled to the first processor, and a connection interface coupled to the first processor. The functional part includes a functional module. The functional module is detachably coupled to the connection interface. When the functional part is coupled to the connection interface, the first processor determines a function of the functional module via the connection interface. The first processor enables the functional module when the trigger is triggered. An operating method for a stylus is also provided.

8 Claims, 6 Drawing Sheets

STYLUS HAVING DETACHABLE FUNCTIONAL PARTS AND OPERATION METHOD THEREOF

BACKGROUND OF THE INVENTION

Field of the Invention

The disclosure relates to an operating apparatus and, more specifically to, a stylus and an operating method thereof.

Description of the Related Art

Portal electronic devices are favored by consumers. Consequently, styluses adapted to the portable electronic devices for touch operation are also developed.

The stylus is usually accommodated in a portal electronic device. If the stylus provides more than normal functions, the application for the portal electronic device equipped with the stylus would be expanded.

BRIEF SUMMARY OF THE INVENTION

According to an aspect of the disclosure, a stylus is provided. The stylus comprises a main body and a functional part. The main body includes a first processor, a trigger coupled to the first processor, and a connection interface coupled to the first processor. The functional part includes a functional module. The functional module is detachably coupled to the connection interface. When the functional part is coupled to the connection interface, the first processor determines a function of the functional module via the connection interface, and the first processor enables the functional module when the trigger is triggered.

According to another aspect of the disclosure, an operating method for a stylus is provided. The stylus includes a main body and a functional part. The main body includes a first processor, a trigger and a connection interface. The functional part includes a functional module. The operating method comprises: determining whether the functional part is coupled to the connection interface by the first processor; determining a function of the functional module via the connection interface by the first processor when the functional part is determined to be coupled to the connection interface; determining whether the trigger is triggered by the first processor after the function of the functional module is determined; and enabling the functional module by the first processor when the trigger is determined to be triggered.

Therefore, in embodiments, the stylus and the operating method thereof include expanded functions.

BRIEF DESCRIPTION OF THE DRAWINGS

These and other features, aspects and advantages of the disclosure will become better understood with regard to the following embodiments and accompanying drawings.

DETAILED DESCRIPTION OF THE EMBODIMENTS

These and other features, aspects, and advantages of the disclosure will become better understood with regard to the following description, appended claims, and accompanying drawings. However, the embodiments are not limited herein. The description of the operation of components is not used for limiting the execution sequence. Any equivalent device with the combination according to the disclosure is in the scope of the disclosure. The components shown in figures are not used for limit the size or the proportion.

Unless mentioned or defined otherwise, the terms used in the disclosure refer to the general meanings known to a person skilled in the art. Additionally, terms with a singular noun used in the specification also covers the scope of the plural noun, and vice versa, unless it conflicts with the disclosure.

Moreover, the term "couple" used in the disclosure refers to that two or more components are physically/electrically connected to each other directly or indirectly, or cooperate or interact with each other.

Figure 1:
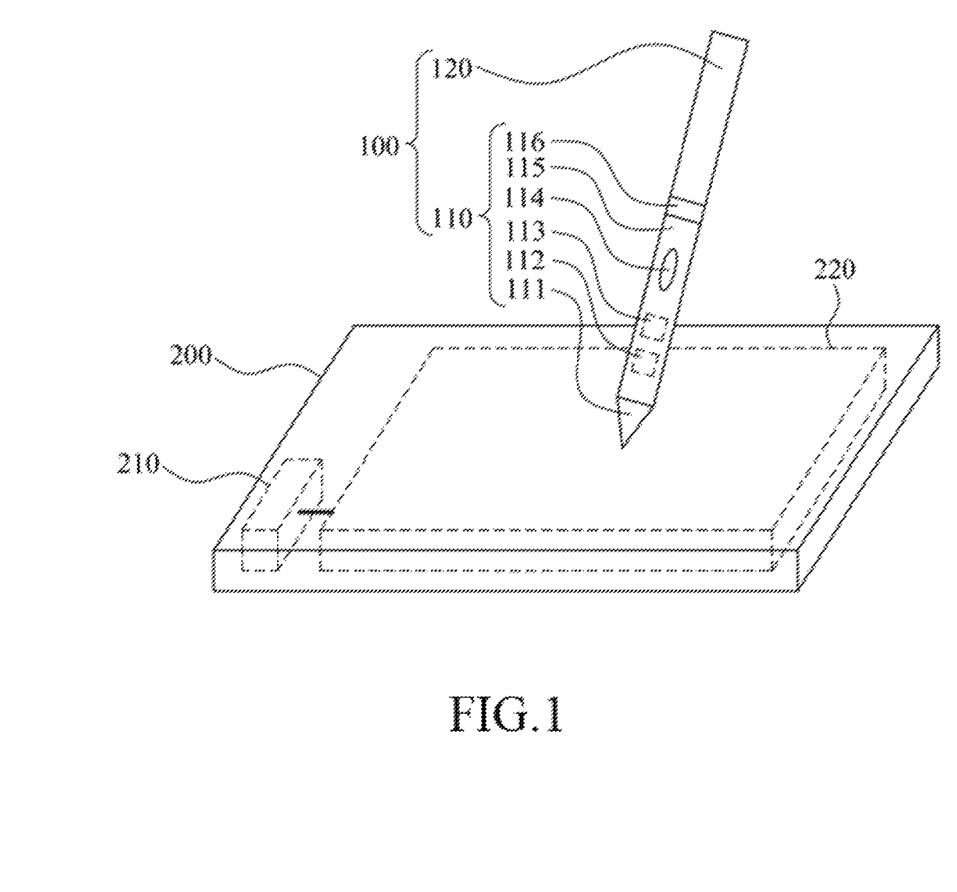
FIG. 1 is a schematic diagram showing a stylus in an embodiment.

FIG. 1 is a schematic diagram showing a stylus 100 in an embodiment. As shown in FIG. 1, a stylus 100 includes a main body 110 and a functional part 120. The main body 110 includes a first processor 112, a trigger 114 and a connection interface 116. The functional part 120 includes a functional module.

The first processor 112 and the trigger 114 are disposed at the stylus housing 115 of the main body 110. The trigger 114 is coupled to the first processor 112. The connection interface 116 is coupled to the first processor 112. The functional part 120 is detachably coupled to the connection interface 116. When the functional part 120 is coupled to the connection interface 116, the first processor 112 determines a function of the functional module of the functional part 120 via the connection interface 116. Then, when the trigger 114 is triggered, the first processor 112 enables the functional module of the functional part 120.

In an embodiment, the main body 110 further includes a tip 111 and a wireless module 113. The tip 111 and the wireless module 113 are both coupled to the first processor 112. The wireless module 113 is disposed inside the stylus housing 115. The tip 111 is used for writing, clicking or drawing on the touch control device 200. The wireless module 113 is configured to be communicated with the touch control device 200 or an external device. In an embodiment, the connection interface 116 is, but not limited to, an inter-integrated circuit ($I^2C$) bus, a serial peripheral connection interface (SPI) bus, or a universal asynchronous receiver/transmitter (UART).

In an embodiment, when the functional part 110 is coupled to the connection interface 116, the first processor 112 requests the functional module of the functional part 120 to generate a signal to determine the function of the functional module of the functional part 120. In an embodiment, the functional module of the functional part 120 sends an identity code (ID code) and a data signal. The first processor 112 receives and processes the identity code and the data signal to determine the function of the functional module of the functional part 120.

In an embodiment, the first processor 112 further sends the identity code and the data signal to a processor 210 of the touch control device 200 via the wireless module 113. The touch control device 200 recognizes the type/function of the stylus 100 that operates cooperatively with the touch control device 200. In an embodiment, the touch control device 200 includes a processor 210 and a touch panel 220. The processor 210 is coupled to the touch panel 220 to receive and process a signal input via the touch panel 220.

Figure 2:
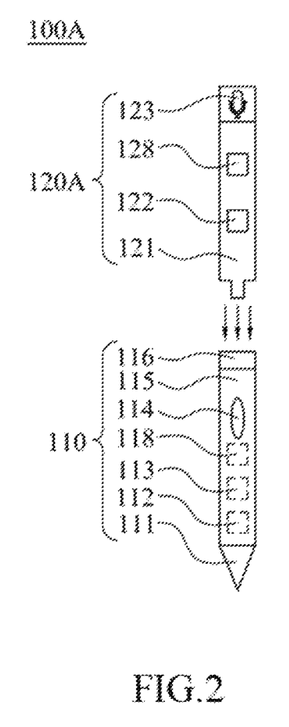
FIG. 2 is a schematic diagram showing a stylus in an embodiment.

FIG. 2 is a schematic diagram showing a stylus 100A in an embodiment. In FIG. 2, the components and the functions of the main body 110 of the stylus 100A are similar to those of the main body 110 of the stylus 100 in FIG. 1, which is not described repeatedly herein. As shown in FIG. 2, a functional part 120A includes a second processor 122 and a functional module 123 (such as, a microphone 123). The second processor 122 and the functional module 123 are disposed inside the stylus housing 121 of the functional part 120A. The second processor 122 is coupled to the microphone 123. When the trigger 114 is triggered, the first processor 112 sends a trigger signal to the microphone 123 via the connection interface 116. Then, the microphone 123 captures sounds to generate an acoustical signal according to the trigger signal. The second processor 122 receives and processes the acoustical signal from the microphone 123 to generate a command signal. Then, the second processor 122 sends the command signal to the first processor 112 via the connection interface 116. The first processor 112 controls the touch control device 200 in FIG. 1 according to the command signal.

In an embodiment, the stylus 100A receives a voice from a user via the microphone 123 to generate the command signal to control the touch control device 200 in FIG. 1. In an embodiment, the stylus 100A records sounds via the microphone 123, and the recorded audio files are stored into the memory 118 of the main body 110 or the memory 128 of the functional part 120A. In this condition, the stylus 100A is used as a recorder pen.

Figure 3:
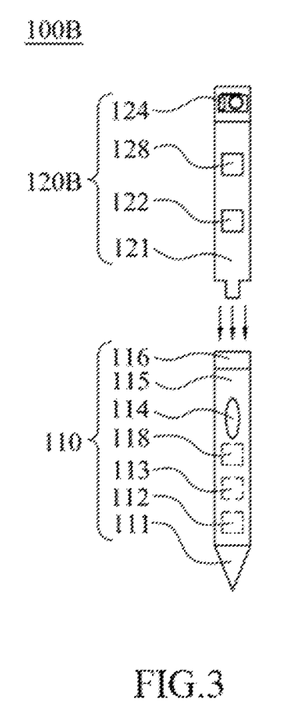
FIG. 3 is a schematic diagram showing a stylus in an embodiment.

FIG. 3 is a schematic diagram showing a stylus 100B in an embodiment. In FIG. 3, in an embodiment, the components and the functions of the main body 110 of the stylus 100B are similar to those of the main body 110 of the stylus 100 in FIG. 1, which are not described again. As shown in FIG. 3, a functional part 120B includes the second processor 122 and a functional module 124 (such as an image capturing device 124). The second processor 122 and the functional module 124 are both disposed inside the stylus housing 121 of the functional part 120B. The second processor 122 is coupled to the image capturing device 124.

When the trigger 114 of the main body 110 is triggered, the first processor 112 sends the trigger signal to the image capturing device 124 via the connection interface 116. Then, the image capturing device 124 captures images according to the trigger signal. The second processor 122 receives the image from the image capturing device 124 and processes the image to generate an image signal. The second processor 122 sends the image signal to the first processor 112 via the connection interface 116. The first processor 112 processes the image signal. Then, the processed image signal is stored into the memory 118 of the main body 110. In an embodiment, the image signal is stored into the memory 118 of the main body 110 or the memory 128 of the functional part 120B according to requirements.

Figure 4:
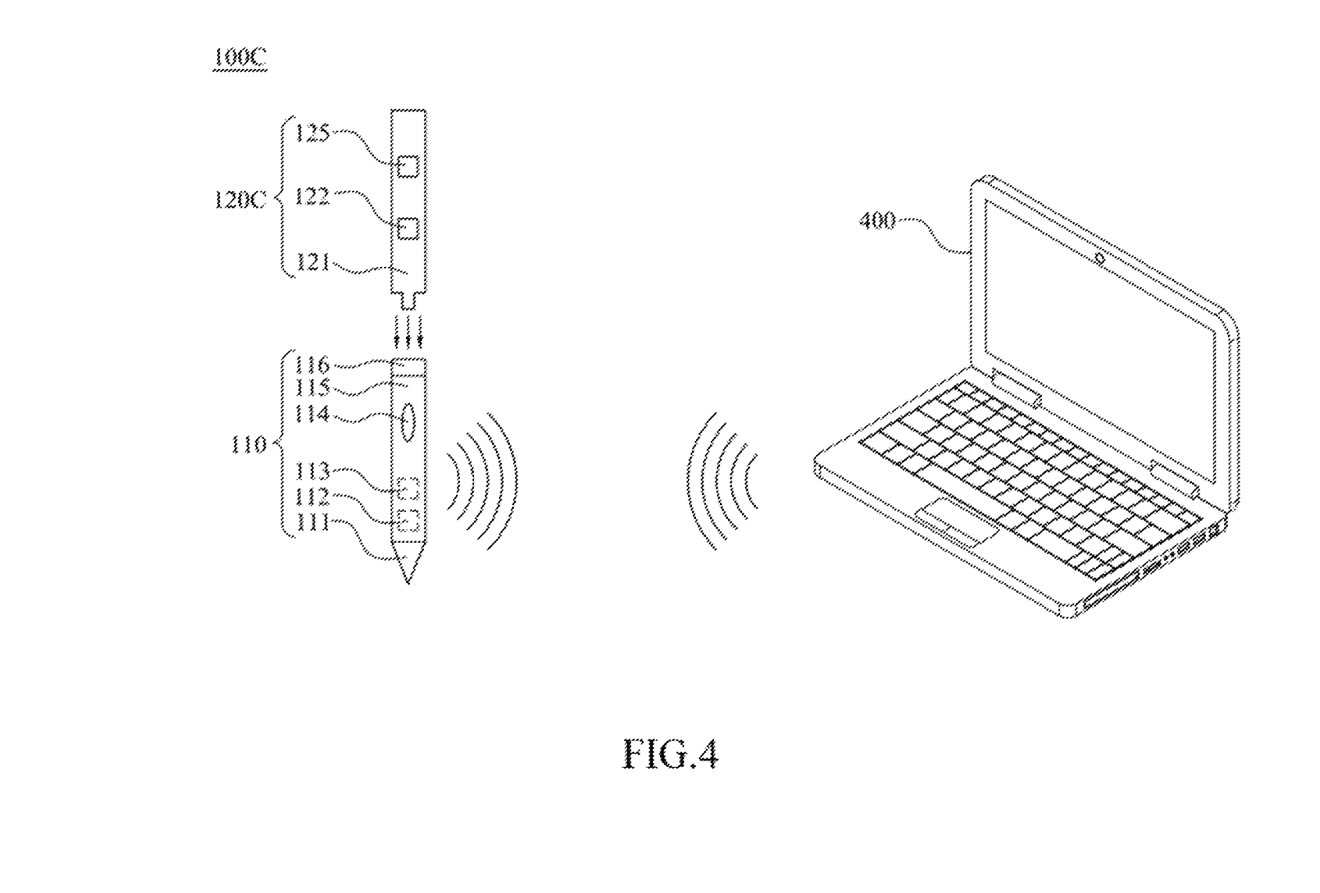
FIG. 4 is a schematic diagram showing a stylus in an embodiment.

FIG. 4 is a schematic diagram showing a stylus 100C in an embodiment. In FIG. 4, in an embodiment, the components and the functions of the main body 110 of the stylus 100C are similar to those of the main body 110 of the stylus 100 in FIG. 1, which is not described repeatedly herein. As shown in FIG. 4, a functional part 120C includes the second processor 122 and a functional module 125 (such as a motion sensor 125). The second processor 122 and the functional module 125 are disposed inside the stylus housing 121 of the functional part 120C.

The second processor 122 is coupled to the motion sensor 125. When the trigger 114 of the main body 110 is triggered, the first processor 112 sends the trigger signal to the motion sensor 125 via the connection interface 116. Then, the motion sensor 125 detects the motion track of the stylus 100C according to the trigger signal. The second processor 122 receives and processes the motion track to generate the command signal. Then, the command signal is sent to the first processor 112 via the connection interface 116. The first processor 112 controls the external device 400 according to the command signal.

In an embodiment, the stylus 100C detects different gestures or motion tracks of the user via the motion sensor 125 to generate the command signal to control the presentation of a brief or a powerpoint on the computer. The external device 400 is, but not limited to, a desktop computer, a notebook computer, a television and the like. In the embodiment, the external device 400 is a notebook computer, which is not limited herein. The external device 400 is controlled according to a command signal for aiming to the next/previous page, or according to a command signal generated based on different gestures or motion tracks. In this condition, the stylus 100C is used as a gesture-based input device or a motion control device.

In an embodiment, the command signal generated by the stylus 100C is used for wirelessly controlling the external device 400 via the wireless communication between the wireless module 113 and the external device 400. In an embodiment, the motion sensor 125 is a six-axis or nine-axis sensor, such as an acceleration sensor, a gyroscope, a magnetic sensor.

Figure 5:
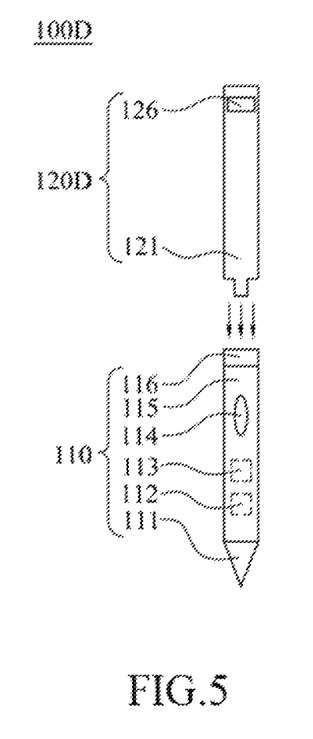
FIG. 5 is a schematic diagram showing a stylus in an embodiment.

FIG. 5 is a schematic diagram showing a stylus 100D in an embodiment. In FIG. 5, in an embodiment, the components and the functions of the main body 110 of the stylus 100D are similar to those of the main body 110 of the stylus 100 in FIG. 1, which is not described repeatedly herein. As shown in FIG. 5, a functional part 120D includes a button 126. The button 126 is disposed at the stylus housing 121 of the functional part 120D.

When the trigger 114 of the main body 110 is triggered, the first processor 112 sends the trigger signal to the button 126 via the connection interface 116. The button 126 is enabled according to the trigger signal. When the button 126 is pressed, the button 126 generates a command signal and sends the command signal to the first processor 112 via the connection interface 116. The first processor 112 changes the color or the type of the strokes that the stylus 100D writes on the touch control device 200 in FIG. 1 according to the command signal.

In other words, the color and/or the type of the strokes that the tip 111 of the stylus 100D writes are changed. In an embodiment, the text the stylus 100D writes on the touch control device 200 is changed from black into red. In an embodiment, the function of the stylus 100D is changed from a pencil or a ballpoint pen to be a brush for coloring or marking on the touch control device 200. In an embodiment, the thickness of lines that the stylus 100D writes or draws on the touch control device 200 is changed.

Figure 6:
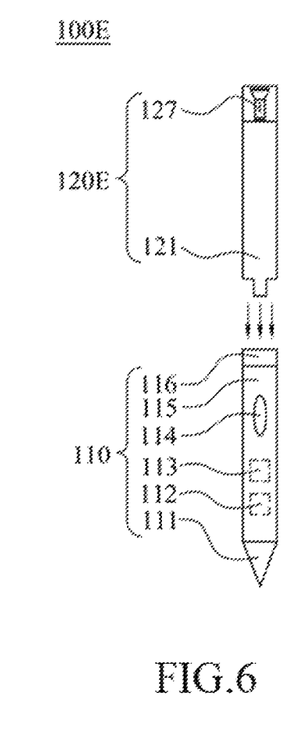
FIG. 6 is a schematic diagram showing a stylus in an embodiment.

FIG. 6 is a schematic diagram showing a stylus 100E in an embodiment. In FIG. 6, in an embodiment, the components and the functions of the main body 110 of the stylus 100E are similar to those of the main body 110 of the stylus 100 in FIG. 1, which is not described repeatedly herein. As shown in FIG. 6, a functional part 120E includes a functional module 127 (such as a light source 127). In an embodiment, the light source 127 is disposed inside the stylus housing 121 of the functional part 120E. When the trigger 114 of the main body 110 is triggered, the first processor 112 sends the trigger signal to the light source 127 via the connection interface 116. The light source 127 emits light according to the trigger signal. In an embodiment, the light source 127 includes at least one of a lamp and a laser light source. In an embodiment, the light source 127 includes the lamp, and the stylus 100E can be used as a flashlight. In an embodiment, the light source 127 includes the laser light source, and the stylus 100E can be used as a laser pointer.

Figure 7:
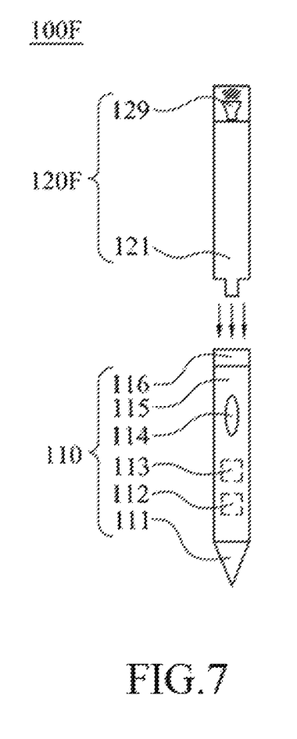
FIG. 7 is a schematic diagram showing a stylus in an embodiment.

FIG. 7 is a schematic diagram showing a stylus 100F in an embodiment. In FIG. 7, in an embodiment, the components and the functions of the main body 110 of the stylus 100F are similar to those of the main body 110 of the stylus 100 in FIG. 1, which is not described repeatedly herein. As shown in FIG. 7, a functional part 120F includes a functional module 129 (such as a loudspeaker 129). When the trigger 114 is triggered, the first processor 112 sends the trigger signal and an acoustical signal to the loudspeaker 129 via the connection interface 116. Then, the loudspeaker 129 is enabled according to the trigger signal to broadcast the sound according to the acoustical signal. In an embodiment, the acoustical signal is amplified by the first processor 112 and then sent to the loudspeaker 129.

Figure 8:
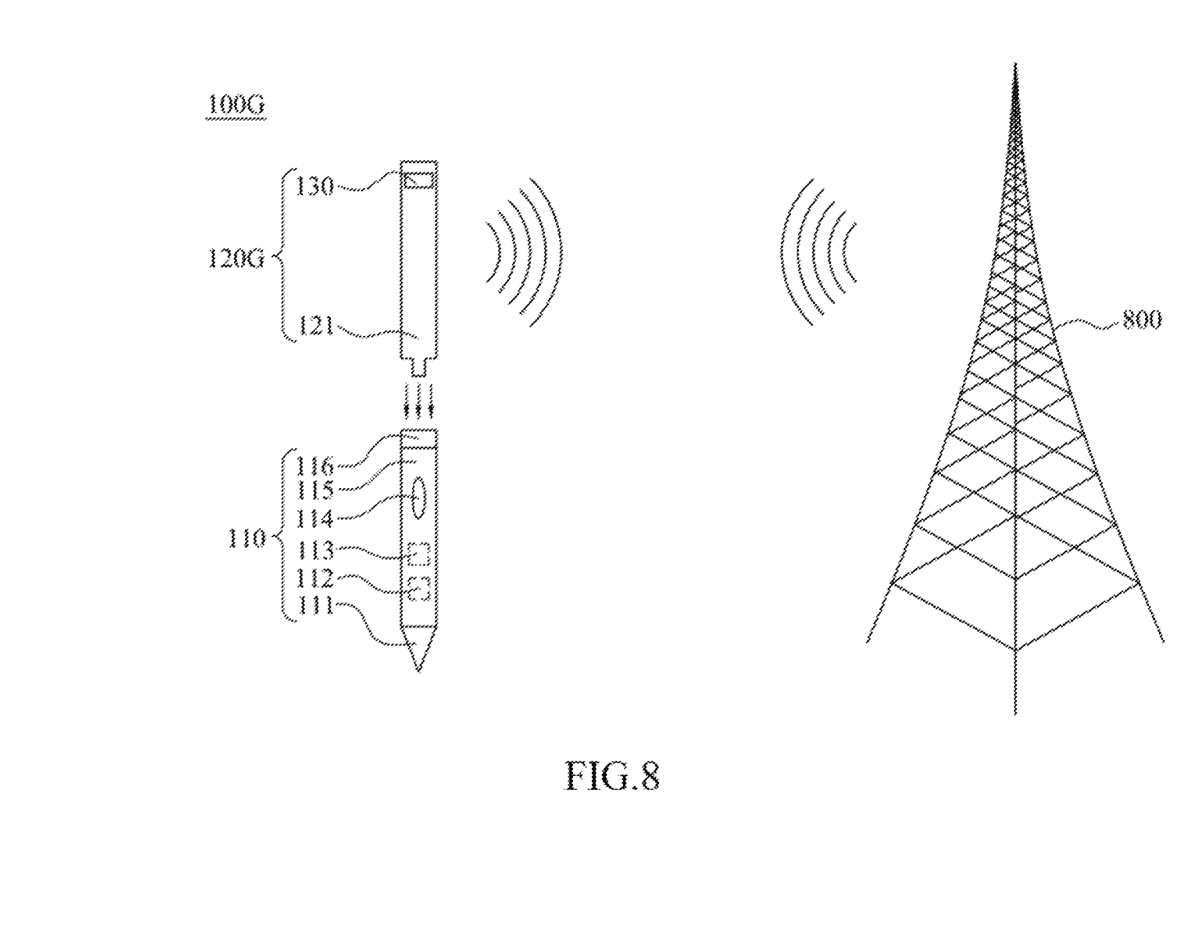
FIG. 8 is a schematic diagram showing a stylus in an embodiment.

FIG. 8 is a schematic diagram showing a stylus 100G in an embodiment. In FIG. 8, in an embodiment, the components and the functions of the main body 110 of the stylus 100G are similar to those of the main body 110 of the stylus 100 in FIG. 1, which is not described repeatedly herein. As shown in FIG. 8, a functional part 120E includes a functional module 130 (such as a receiver/transmitter 130). When the trigger 114 of the main body 110 is triggered, the first processor 112 sends the trigger signal to the receiver/transmitter 130 via the connection interface 116. Then, the receiver/transmitter 130 receives a signal or light from an external base station 800. In an embodiment, the receiver/transmitter 130 is, but not limited to, a light-sensitive receiver/transmitter or a wireless signal receiver/transmitter. In an embodiment, the light-sensitive receiver/transmitter 130 receives visible light, infrared rays, near infrared rays, far infrared rays, laser or the like emitted from the external base station 800. In an embodiment, the wireless signal receiver/transmitter 130 receives wireless signals transmitted by the external base station 800. In embodiments, the types and the number of the receiver/transmitter 130 and the external base station 800 can be changed according to requirements, which is not limited herein.

Figure 9:
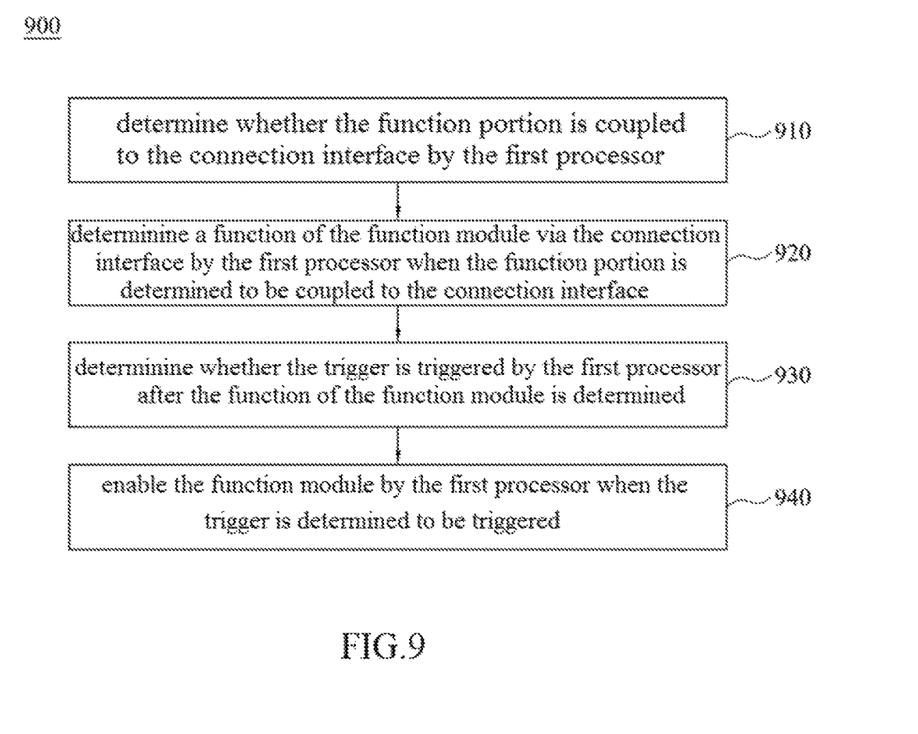
FIG. 9 is a flow chart of an operating method for a stylus in an embodiment.

FIG. 9 is a flow chart of an operating method 900 for a stylus in an embodiment. As shown in FIG. 9, an operating method 900 includes the following steps:
- step 910: the first processor determines whether the functional part is coupled to the connection interface;
- step 920: when it is determined that the functional part is coupled to the connection interface, the first processor determines a function of the functional module via the connection interface;
- step 930: after the function of the functional module is determined, the first processor determines whether the trigger is triggered; and
- step 940: when it is determined that the trigger is triggered, the first processor enables the functional module.

To better understand the operating method 900, please both refer to FIG. 1 and FIG. 9. In step 910, the first processor 112 determines whether the functional part 120 is coupled to the connection interface 116. In step 920, when the first processor 112 determines the functional part 120 is coupled to the connection interface 116, the first processor 112 determines a function of the functional module of the functional part 120 via the connection interface 116.

Then, in step 930, after the function of the functional module of the functional part 120 is determined, the first processor 112 determines whether the trigger 114 is triggered. In step 940, when it is determined that the trigger 114 is triggered, the first processor 112 enables the functional module.

In an embodiment, the step 920 further includes the following sub-steps: when the functional part 110 is coupled to the connection interface 116, the first processor 112 requests the functional module of the functional part 120 to generate a signal to determine the function of the functional module of the functional part 120. In an embodiment, the functional module of the functional part 120 sends back an identity rode (ID code) and a data signal. The first processor 112 receives and processes the identity code and the data signal to determine the function of the functional module of the functional part 120. In an embodiment, the first processor 112 further sends the identity code and the data signal to the processor 210 of the touch control device 200 via the wireless module 113. Then, the touch control device 200 recognizes the type/function of the stylus 100 that operates cooperatively with the touch control device 200 according to the identity code and the data signal.

In an embodiment, please also refer to FIG. 2, the operating method 900 further includes the following steps: when the trigger 114 is triggered, the first processor 112 sends the trigger signal to the functional module 123 (such as the microphone 123) via the connection interface 116. The microphone 123 captures the sounds to generate the acoustical signal according to the trigger signal. Then, the second processor 122 receives and processes the acoustical signal from the microphone 123 to generate and send the command signal to the first processor 112 via the connection interface 116. The first processor 112 controls the touch control device 200 in FIG. 1 according to the command signal.

In an embodiment, please also refer to FIG. 4, the operating method 900 further includes the following steps: when the trigger 114 is triggered, the first processor 112 sends the trigger signal to the functional module 125 (such as the motion sensor 125) via the connection interface 116. Then, the motion sensor 125 detects the motion track of the stylus 100C according to the trigger signal. Then, the second processor 122 receives and processes the motion track to generate and send the command signal to the first processor 112 via the connection interface 116. Then, the first processor 112 controls the external device 400 according to the command signal.

In an embodiment, the step 940 further includes the following sub-steps: when the trigger 114 is triggered, the first processor 112 sends the trigger signal to the functional module. The functional module is enabled according to the trigger signal.

In an embodiment, please also refer to FIG. 5, the operating method 900 further includes the following steps: when the trigger 114 is triggered, the first processor 112 sends the trigger signal to the button 126 via the connection interface 116. Then, when the button 126 is pressed, the button 126 generates and sends a command signal to the first processor 112 via the connection interface 116. Then, the first processor 112 changes the color or the type of the strokes that the stylus 100D writes on the touch control device 200 in FIG. 1 according to the command signal.

In an embodiment, please also refer to FIG. 8, the operating method 900 further includes the following steps: when the trigger 114 of the main body 110 is triggered, the first processor 112 sends the trigger signal to the functional module 130 (such as the receiver/transmitter 130) via the connection interface 116. Then, the receiver/transmitter 130 receives the signal or the light emitted from the external base station 800.

In sum, the stylus and the operating method thereof in the embodiments have expanded functions.

Although the disclosure has been disclosed with reference to certain embodiments thereof, the disclosure is not for limiting the scope. Persons having ordinary skill in the art may make various modifications and changes without departing from the scope of the disclosure. Therefore, the scope of the appended claims should not be limited to the description of the embodiments described above.

What is claimed is:

1. A stylus comprising:
   a main body including:
   a first processor;
   a trigger coupled to the first processor; and
   a connection interface coupled to the first processor; and
   a functional part including a functional module, the functional module is detachably coupled to the connection interface, when the functional part is coupled to the connection interface, the first processor determines a function of the functional module via the connection interface, and the first processor enables the functional module when the trigger is triggered,
   wherein when the functional part is coupled to the connection interface, the first processor requests the functional module to generate a signal to determine the function of the functional module, and the functional module sends back an identity code and a data signal, the first processor receives and processes the identity code and the data signal to determine the function of the functional module,
   wherein the functional part further includes:
   a button, wherein when the trigger is triggered, the first processor sends a trigger signal to the button, the button operates according to the trigger signal, and the button generates and sends a command signal to the first processor when the button is pressed.

2. The stylus according to claim 1, wherein the functional part includes:
   a second processor coupled to the functional module for receiving and processing a signal from the functional module to generate a signal and send a command signal to the first processor.

3. The stylus according to claim 2, wherein the functional module includes at least one of a microphone, an image capturing device, a motion sensor, a light source, a loudspeaker and a transceiver.

4. The stylus according to claim 3, wherein when the trigger is triggered, the first processor sends a trigger signal to the functional module, and the functional module is enabled according to the trigger signal.

5. An operating method for a stylus, the stylus includes a main body and a functional part, the main body includes a first processor, a trigger and a connection interface, the functional part includes a functional module, the operating method comprising:
   determining whether the functional part is coupled to the connection interface by the first processor;
   determining a function of the functional module via the connection interface by the first processor when the functional part is determined to be coupled to the connection interface;
   determining whether the trigger is triggered by the first processor after the function of the functional module is determined; and
   enabling the functional module by the first processor when the trigger is determined to be triggered,
   wherein the step of determining the function of the functional module via the connection interface by the first processor comprises:
   requesting, by the first processor, the functional module to generate a signal by the first processor to determine the function of the functional module according to the signal;
   sending back, by the functional module, an identity code and a data signal; and
   receiving and processing, by the first processor, the identity code and the data signal to determine the function of the functional module,
   wherein the functional part includes a button, and the operating method further comprises:
   sending, by the first processor, a trigger signal to the button when the trigger is triggered; and
   generating and sending, by the button, a command signal to the first processor when the button is pressed.

6. The operating method for the stylus according to claim 5, wherein the functional part includes a second processor, the operating method further comprises:
   receiving and processing a signal from the functional module by the second processor to generate and send a command signal to the first processor.

7. The operating method for the stylus according to claim 6, wherein the functional module includes at least one of a microphone, an image capturing device, a motion sensor, a light source, a motion sensor, a loudspeaker and a transceiver.

8. The operating method for the stylus according to claim 7, wherein the step of enabling the functional module by the first processor when the trigger is determined to be triggered comprises:
   when the trigger is triggered, the first processor sends a trigger signal to the functional module, and the functional module is enabled according to the trigger signal.

* * * * *